United States Patent [19]

Sakakibara et al.

[11] Patent Number: 4,770,144
[45] Date of Patent: Sep. 13, 1988

[54] KNOCK CONTROL APPARATUS AND METHOD FOR INTERNAL COMBUSTION ENGINES

[75] Inventors: Koji Sakakibara, Hekinan; Seiitirou Nishikawa, Anjo; Hiroshi Haraguchi, Kariya, all of Japan

[73] Assignee: Nippondenso Co., Ltd., Kariya, Japan

[21] Appl. No.: 82,088

[22] Filed: Aug. 5, 1987

[30] Foreign Application Priority Data

Aug. 8, 1986 [JP] Japan .................................. 61-187441

[51] Int. Cl.$^4$ ............................................... F02P 5/14
[52] U.S. Cl. .......................................... 123/425; 73/35
[58] Field of Search ..................... 123/425, 435; 73/35

[56] References Cited

U.S. PATENT DOCUMENTS 4,423,621 1/1984 Kenichi et al. .
4,498,331 2/1985 Nakamura et al. .
4,675,821 6/1987 Aoki et al. ..................... 123/425 X Primary Examiner—Tony M. Argenbright
Attorney, Agent, or Firm—Cushman, Darby & Cushman

[57] ABSTRACT

A knock control apparatus for an internal combustion engine which prevents variation of a control knock sound even if an output of a knock sensor is varied due to the variations in performance among different engines or knock sensors, aging of the engine or knock sensor or the like. A given correction quantity is added to an average value of an output signal of the knock sensor, and the sum is increased K times by a K-value varying with the operating conditions of the engine, thereby generating a knock discrimination level. In accordance with the presence or absence of knocking determined by comparing the knock discrimination level and an output signal of the knock sensor, a knock control factor, e.g., ignition timing, supercharge pressure or the like of the engine is controlled.

12 Claims, 8 Drawing Sheets

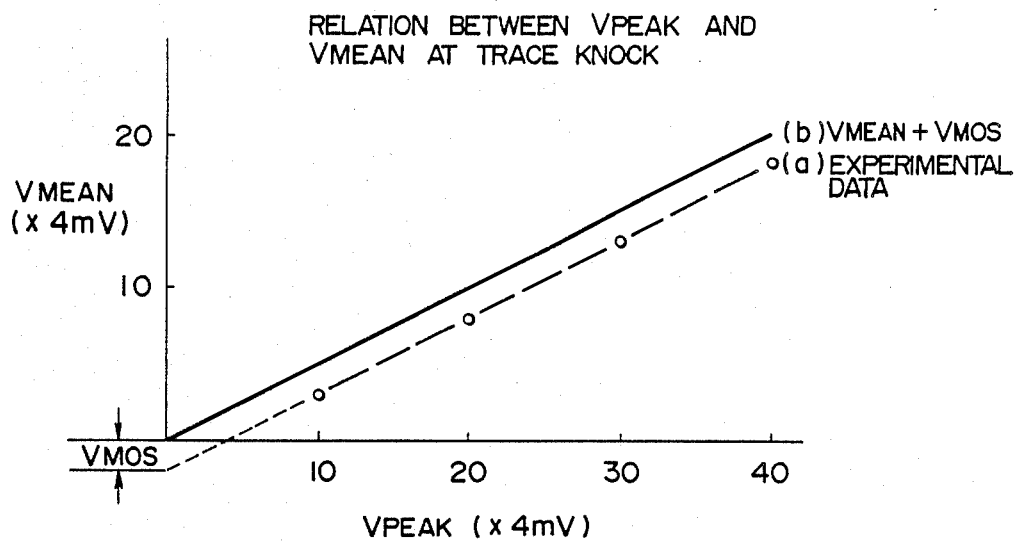
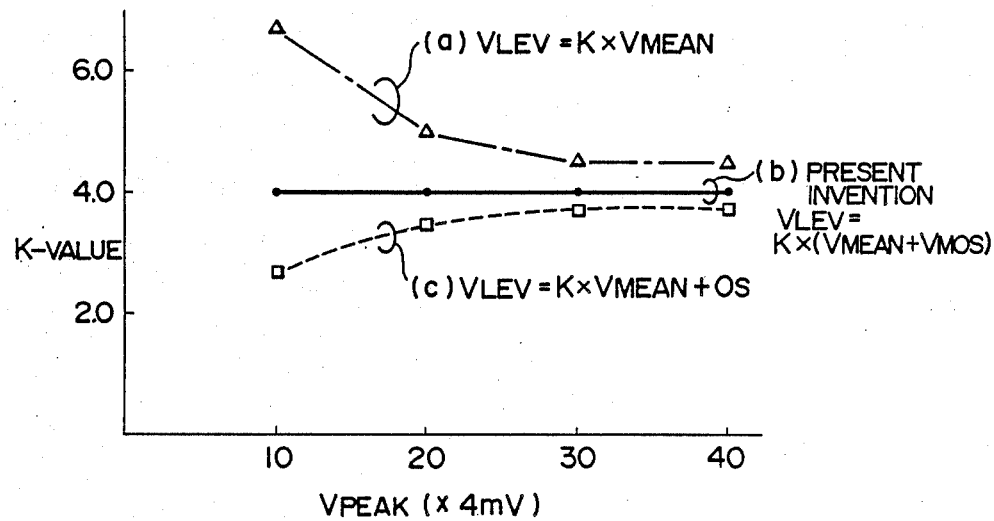

KNOCK CONTROL APPARATUS AND METHOD FOR INTERNAL COMBUSTION ENGINES

BACKGROUND OF THE INVENTION

The present invention relates to a knock control apparatus and method for an internal combustion engine and contemplates controlling the ignition timing, supercharge pressure or the like of the engine in response to the occurrence of engine knocking.

In a knock control apparatus of this type, a knock discrimination level $V_L$ is generally produced by multiplying a knock sensor signal average level $V_{MEAN}$ by an adaptation constant K and then adding an offset value $O_S$ to the product, thereby obtaining $V_L = K \times V_{MEAN} + O_S$ (e.g., U.S. Pat. No. 4,423,621). However, the above-mentioned conventional apparatus is disadvantageous in that due to the variations in characteristics among different engines or knock sensors caused during their manufacture, aging of the engine or the knock sensor or the like, the output of the knock sensor is varied and hence the required adaptation factor (required K-value) is varied, thereby causing the control knock sound to vary.

Also, particularly in the case of the known apparatus of the type which employs amplifiers having a plurality of amplification factors for knock sensor signal amplifying purposes so as to selectively use the amplification factors in accordance with the magnitude of a knock sensor signal or the like, the above-mentioned problem becomes more manifest. One of the causes for this problem is the offset value $O_S$, for the offset value $O_S$ is a constant value. Thus, it is evident that the required K-value is varied by, for example, the amplification factor of a knock sensor signal.

SUMMARY OF THE INVENTION

It is an object of the present invention to overcome the foregoing deficiencies in the prior art by preventing the knocking sound from being varied by a variation in the magnitude of a knock sensor signal.

In accordance with one aspect of the invention there is thus provided as illustrated in FIG. 1 a knock control apparatus for an internal combustion engine including a knock sensor for detecting the occurrence of knocking in the engine, average value generating means for determining the average value of an output signal from the knock sensor, knock discrimination level generating means for generating a knock discrimination level in accordance with the average value determined by the average value generating means, knock discriminating means for comparing the knock discrimination level generated by the knock discrimination level generating means and the output signal of the knock sensor to determine the presence or absence of knocking, driver means responsive to the result of the determination of the knock discriminating means to control a knock control factor, e.g., the ignition timing or the supercharge pressure, and average value correcting means for adding a predetermined correction quantity to the average value determined by the average value generating means to generate the knock discrimination level.

Thus, noting the fact that an error of the average value $V_{MEAN}$ is determined by the performance of the A-D converter, computing capacity, etc., the error is preliminarily examined so that the resulting error value is corrected by the average value correcting means when generating a knock discrimination value.

In accordance with the invention, by virtue of the fact that a knock discrimination level is determined by adding a predetermined correction quantity to the average value from the average value generating means, there is a great effect that the knocking sound is prevented from being varied even if the knock sensor output is varied due to the variations in characteristics among the different engines or knock sensors caused during their manufacture, aging of the engine or the knock sensor or the like.

BRIEF DESCRIPTION OF THE DRAWINGS

FIGS. 8 and 9 are respectively a peak value-average value characteristic diagram and a peak value-adaptation constant characteristic diagram before and after the A-D conversion of a knock sensor signal, which are useful for explaining the operation of the apparatus shown in FIG. 2.

DESCRIPTION OF THE PREFERRED EMBODIMENTS

Figure 1:
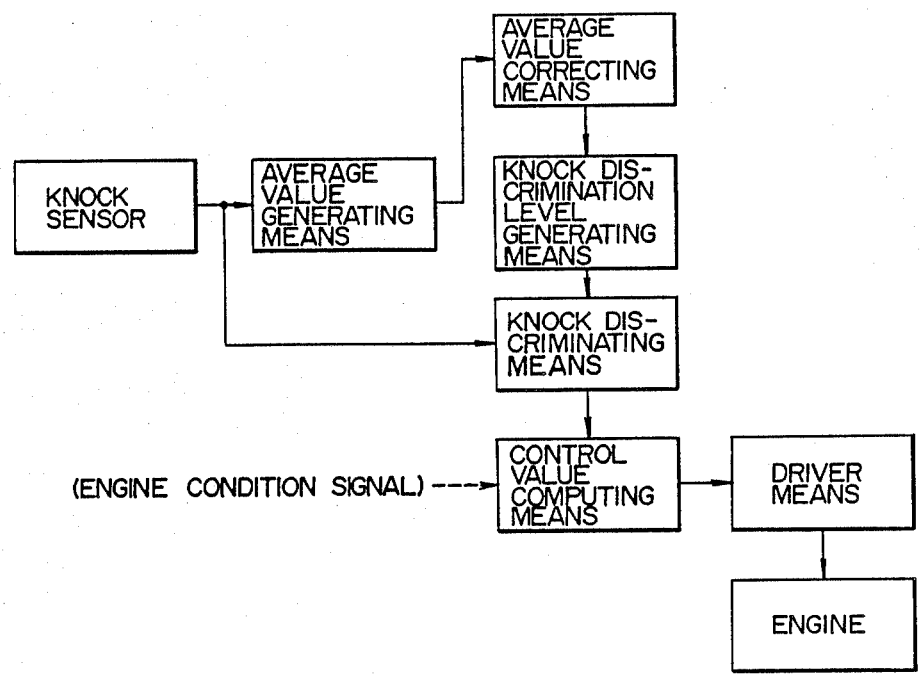
FIG. 1 is a block diagram showing a knock control apparatus in accordance with the invention.
Figure 2:
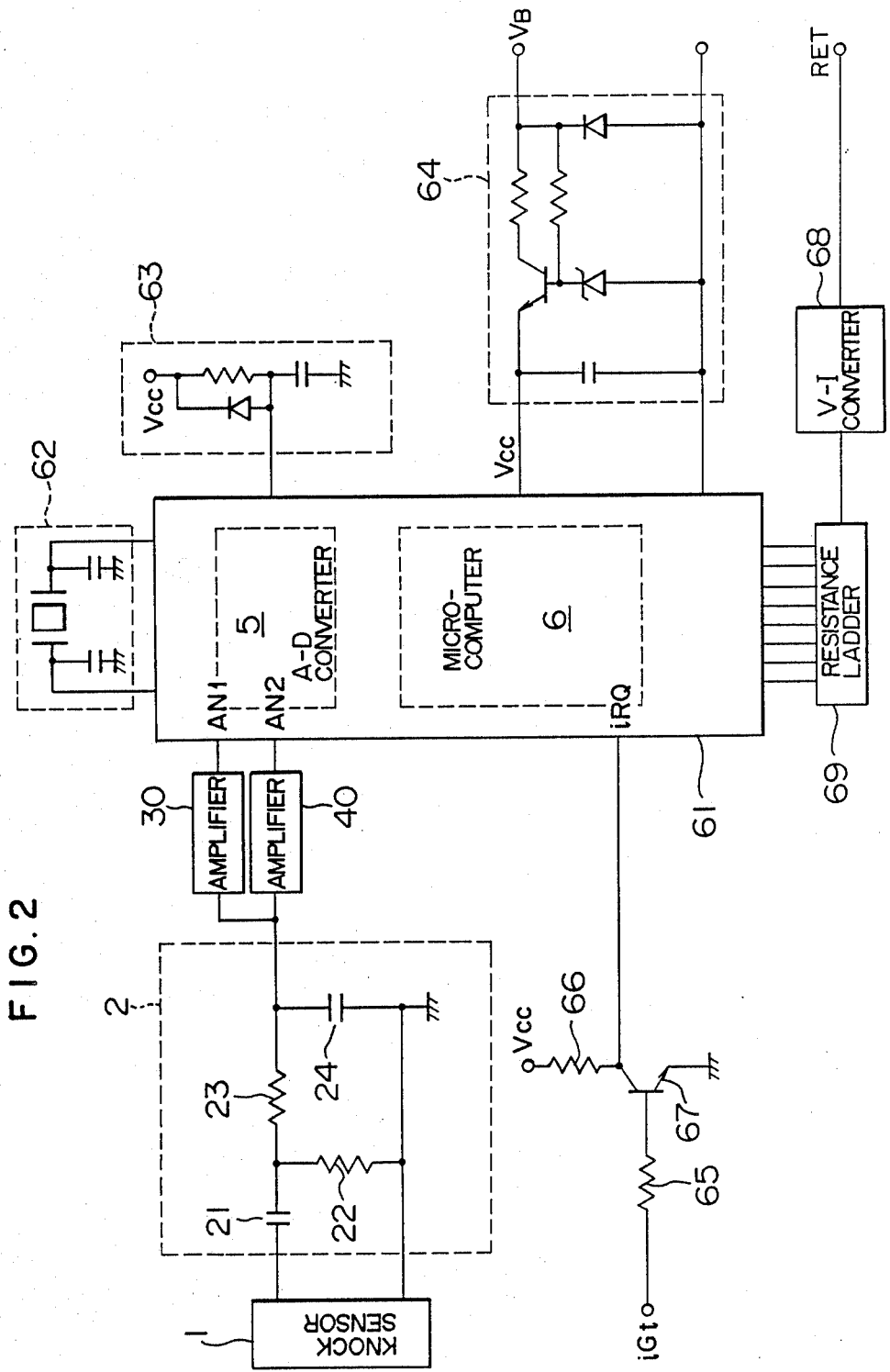
FIG. 2 is an electric circuit diagram showing an embodiment of an apparatus according to the invention.

Referring to FIG. 2, numeral 1 designates a knock sensor for detecting the vibration, sound or the like caused by knocking in an engine, 2 a filter circuit for transmitting only the frequency components of the detection signal of the knock sensor 1 which are peculiar to the knocking, 30 and 40 amplifiers for amplifying the signal transmitted through the filter, and 5 an A-D converter for converting the detection signal or analog signal to a digital signal. Numeral 6 designates a microcomputer including a central processing unit (CPU), memories (ROM, RAM), input/output units (I/O), etc., whereby, as will be described later, in response to a signal generated by the attendant comparison function of the A-D converter 5 with respect to a threshold level, an A-D conversion starting timing signal is generated to average the output signals (digital signals) of the A-D converter 5 to compute a knock discrimination level and also the values of the digital signals within a given period are compared with the knock discrimination level to determine the presence or absence of knocking, thereby responding to the ignition signal from an ignition timing control apparatus which is not shown and outputting a desired result to it.

The filter circuit 2 is a bandpass filter circuit including a high-pass filter circuit including a capacitor 21 and a resistor 22 and a low-pass filter circuit including a resistor 23 and a capacitor 24. When the detection signal from the knock sensor 1 is passed through the filter circuit 2, the noise component is removed and the signal is converted to a sinusoidal waveform having knock frequencies around a frequency of 8 kHz, amplified by the amplifier 30 or 40 and applied to an analog terminal $AN_1$ or $AN_2$ of a single chip microcomputer 61 incorporating the A-D converter 5 and the microcomputer 6. In this case, the amplifiers 30 and 40 have different amplification factors and the amplification factor of the amplifier 40 is, for example, selected to be ¼ of that of the amplifier 30. In this embodiment, the Fujitsu MB 88413 is used as the single chip microcomputer.

Connected to the single chip microcomputer 61 are conventional oscillator 62, power supply on-reset circuit 63 and power supply circuit 64. The ignition signal iGt (not shown) is applied to an interrupt terminal iRQ of the single chip microcomputer 61 through a circuit including an input resistor 65, a collector resistor 66 and a transistor 67. The output from the single chip microcomputer 61 is subjected to D-A conversion through a resistance ladder 69 and supplied through a voltage-current converter 68 to the ignition timing control apparatus which is not shown.

Figure 3:
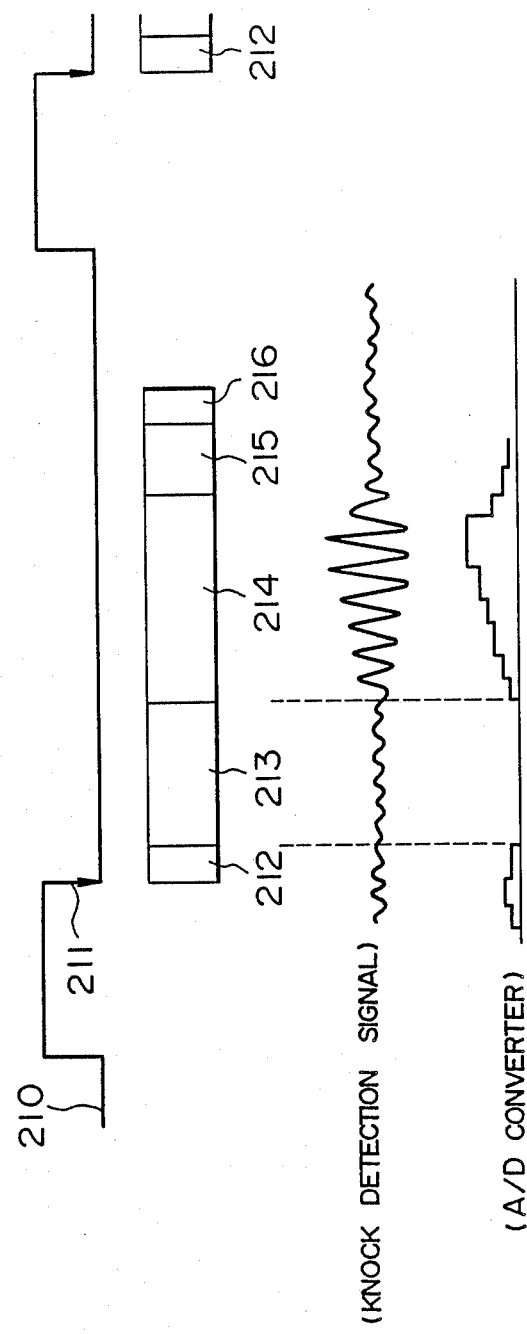
FIG. 3 is a timing chart useful for explaining the operation of the apparatus shown in FIG. 2.
Figure 4:
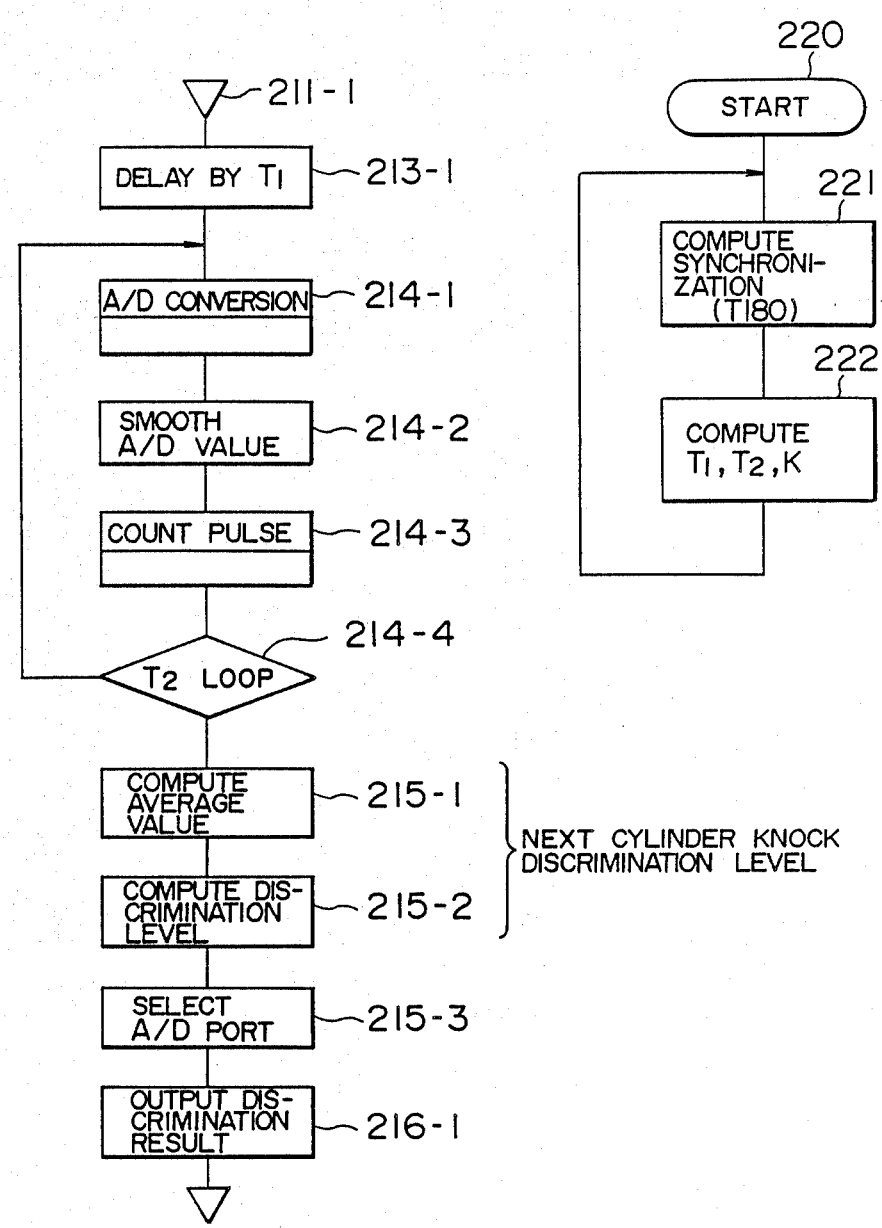
FIGS. 4, 6 and 7 are flow charts showing the processing procedures of the microcomputer in the apparatus shown in FIG. 2.

The operation of the present embodiment will now be described with reference to FIGS. 3 to 7. FIG. 3 shows a timing chart for the knock detection and discrimination and the retard angle computation and outputting of the embodiment. FIG. 4 is a flow chart showing the flow of a basic program. In accordance with its main routine started at a start step 220, the computation of an ignition period T180 by a built-in timer (step 221), the computation of a delay time $T_1$ (masking time) until the beginning of the A-D conversion according to the value of the ignition period, the computation of an A-D conversion time (discrimination time) $T_2$ and the computation of a multiplication factor (K-value) varying with the engine speed and preliminarily determined experimentally so as to be added to a knock sensor signal average value to determine a knock discrimination level which is compared with an A-D converted value (step 222) are performed.

The ignition signal (iGt) applied from the ignition timing control apparatus to the interrupt input terminal iRQ of the single chip microcomputer 61 is inverted by the transistor 67 (210, FIG. 3) and applied to the microcomputer 61, thereby requesting an interrupt to the single chip microcomputer 61 (step 211-1 in FIG. 4) in response to its trailing edge (211, FIG. 3). After the interrupt routine has been started, microcomputer 61 is placed in a wait state for A-D conversion (step 213-1 in FIG. 4) during the masking time $T_1$ (213, FIG. 3) following the interrupt processing (212, FIG. 3). After the end of the masking time, the A-D conversion is performed repeatedly (step 214-1 in FIG. 4) for the duration of the time $T_2$ (indicated by 214, FIG. 3) so that after the resulting A-D converted values have been subjected to a smoothing process (step 214-2 in FIG. 4), each A-D converted value $V_{AD}$ is compared with the previously computed cylinder knock discrimination level $V_{LEV}$ and a knock pulse is counted up when $V_{LEV} < V_{AD}$ (step 214-3 in FIG. 4). The smoothing process on the A-D converted value is effected as follows $$V_{MADi} = V_{MADi-1} + \frac{V_{ADi} - V_{MADi-1}}{16}$$

where $V_{ADi}$ is the current A-D converted value, $V_{MADi-1}$ the smoothed result up to the preceding event and $V_{MADi}$ the current smoothed result.

Then, after the end of the A-D conversion (step 214-4 in FIG. 4), an average value of the A-D converter 5 is computed at the timing of 215 in FIG. 3 and a cylinder knock discrimination level for the next discrimination interval is computed (steps 215-1, 215-2 in FIG. 4).

Here, the average value calculation of the step 215-1 is performed in the following way $$V_{MEAN} = V_{MEAN-1} + \frac{V_{MAD} - V_{MEAN-1}}{4}$$

where $V_{MAD}$ is the final smoothed result computed at the step 214-2, $V_{MEANi-1}$ the average value up to the preceding cycle and $V_{MEAN}$ the average value up to the current event.

Then, the discrimination level calculation of the step 215-2 is performed as follows $$V_{LEV} = K \times (V_{MEAN} + V_{MOS})$$

where $V_{MOS}$ is a constant for correcting an A-D conversion error, computing error or the like and it is preliminarily determined by experiments. In other words, $V_{MOS}$ is set to a small value near to the resolution of $V_{MEAN}$ so that where the resolution is 1 LSB (lowest significant bit) and the outputted value of $V_{MEAN}$ is between 0 and 50 LSB, then the value of $V_{MOS}$ is set to one of the values ranging from 1 to 4 LSB, e.g., 2 LSB.

Thereafter, at a step 215-3 of FIG. 4, the A-D conversion port selection is effected as follows. If the current A-D conversion is effected through the port $AN_1$ and the value of $V_{LEV}$ is greater than a given value $V_{MAX}$, the following A-D conversions are effected through the port $AN_2$ to which is connected the amplifier 40 of the smaller amplification factor, and the $V_{LEV}$ and $V_{MEAN}$ of all the cylinders are each shifted to the right by two bits. On the contrary, where the current A-D conversion is effected at the port $AN_2$ and the value of $V_{LEV}$ is smaller than a given value $V_{MEAN}$, the following A-D conversions are effected through the port $AN_1$ having the greater amplification factor, and the $V_{LEV}$ and $V_{MEAN}$ of all the cylinders are each shifted to the left by two bits.

Then, the discrimination result with respect to the discrimination level is outputted to the 8-bit port of the microcomputer 61 at the timing of 216 in FIG. 3 (step 216-1 in FIG. 4) so that it is subjected to D-A conversion through the resistance ladder 69 and the resulting analog value is converted to a current by the voltage-current converter 68, thereby supplying the current to the ignition timing control apparatus which is not shown. The discrimination output is given in terms of a retard angle.

The operation of the A-D conversion section and the intensity discriminating section will now be described in greater detail with reference to FIGS. 5, 6 and 7.

Figure 5:
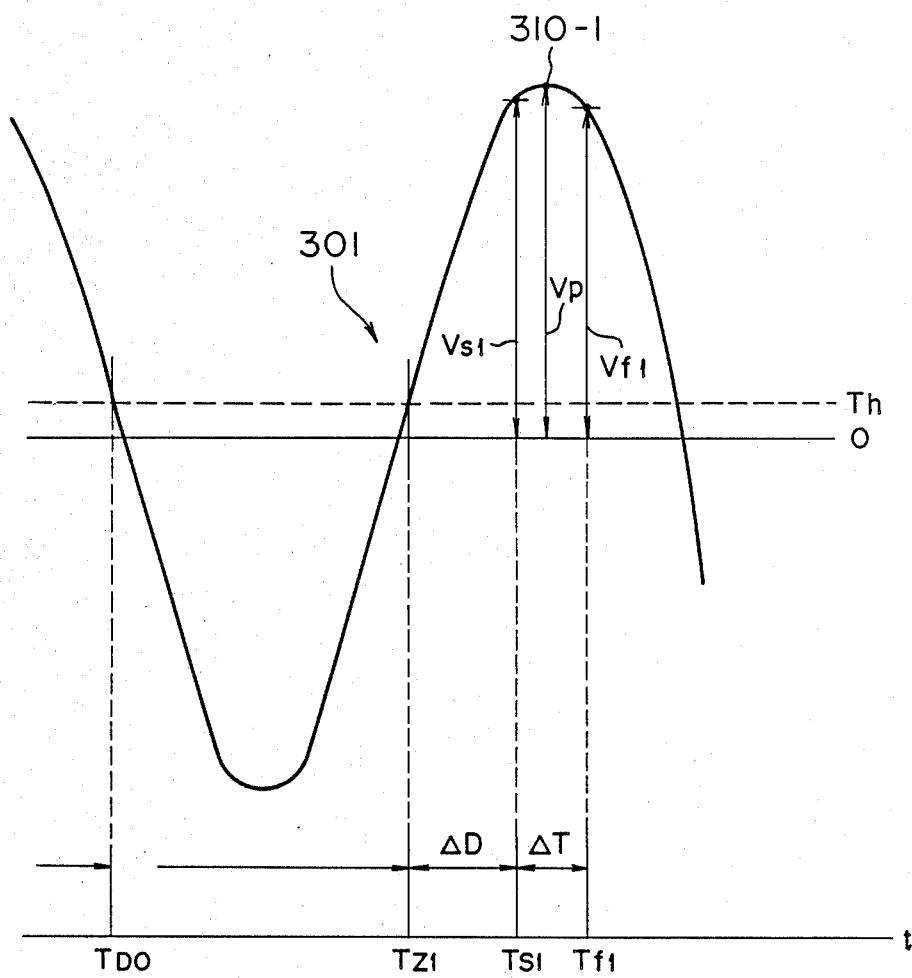
FIG. 5 is a diagram showing the timing of A-D conversion in the apparatus of FIG. 2.

In FIG. 5, designated by 301 is a waveform corresponding to one period of a knock detection signal. As mentioned previously, the detection signal has a sinusoidal waveform of 8 kHz.

Figure 6:
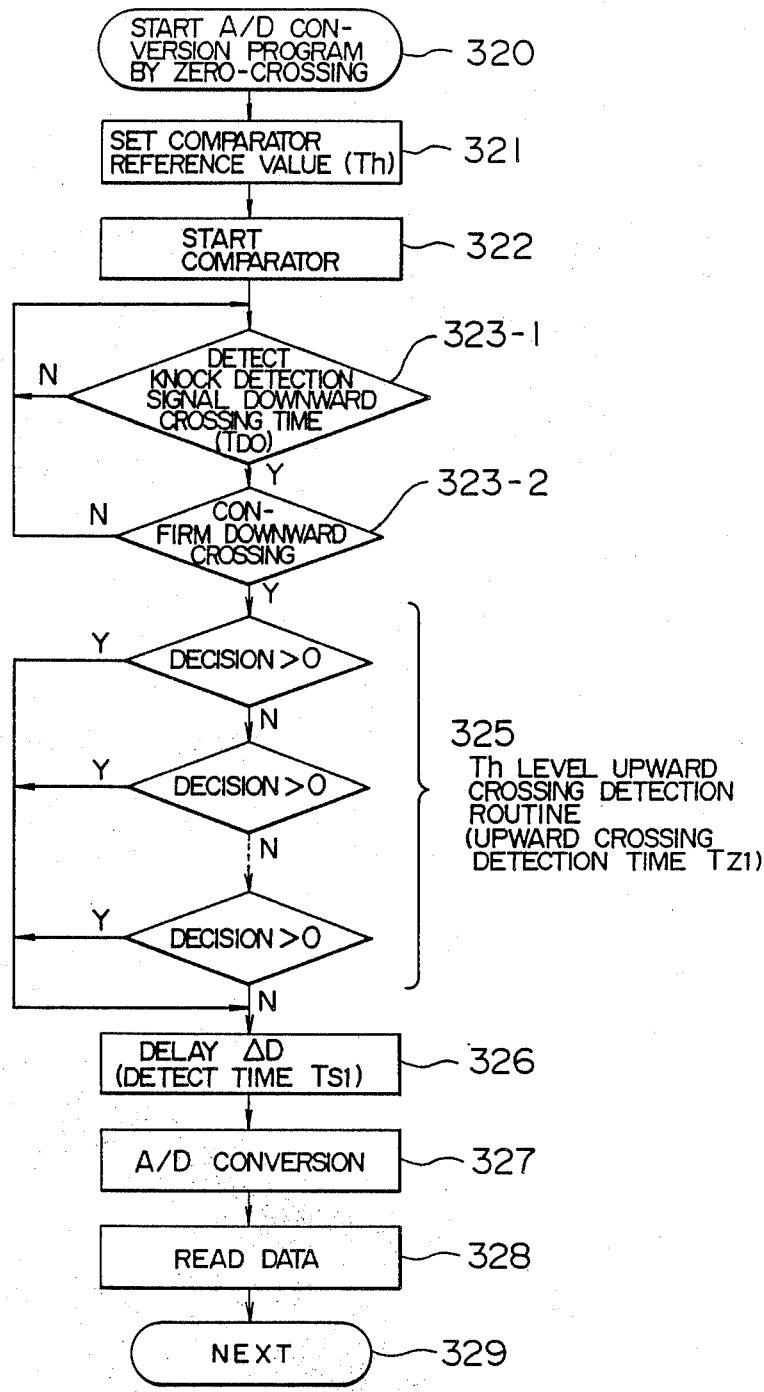

Referring now to FIG. 6, when the A-D conversion program is started (step 320), the mode of a comparator performing the comparison function of the single chip microcomputer 61 is selected, and a threshold level $T_h$ with respect to the zero level is established (step 321). Then, the comparator is started (step 322) so that a time $T_{DO}$ at which the sinusoidal waveform 301 downwardly crosses the threshhold level $T_h$ is detected (step 323-1) and also the threshold level $T_h$ is confirmed for the purpose of preventing any malfunction (step 323-2). After the detection of the threshold level $T_h$, a transfer is made to a routine for detecting an upward crossing of the threshold level $T_h$ (step 325), and a given time delay $\Delta D$ from the upward crossing detection time $T_{Z1}$ is provided, thereby reaching a time $T_{S1}$. It is to be noted that in the upward crossing detection routine (step 325), the decisions are arranged in cascade so that even if no upward crossing is detected, a transfer is eventually made to a step 326 to prevent the computational processing from running into an endless loop. Then, a time for starting the A-D conversion from the time $T_{S1}$ is established centering on a peak 310-1 of the sinusoidal waveform 301. In this case, the near-to-peak slope of the sinusoidal waveform 301 is considered to be substantially constant as compared with the slopes of the upwardly and downwardly crossing portions of the sinusoidal waveform, and therefore a peak value $V_P$ of the sinusoidal waveform 301 is obtained even if the A-D conversion is effected by delaying it to near to the peak by the delay time $\Delta D$ (step 327). In other words, a value $V_{S1}$ obtained at the conversion starting time $T_{S1}$ and a value $V_{f1}$ obtained at an end time $T_{f1}$ differ little from the peak value $V_p$, and moreover, this embodiment employs the A-D conversion of the sequential comparison type thus causing the resulting A-D converted value to become closer to $V_p$ than $V_{S1}$ and $V_{f1}$ within interval $\Delta T$. The thus obtained converted value is read and stored in the memory (step 328), and a transfer is made to the next operating step 329.

Figure 7:
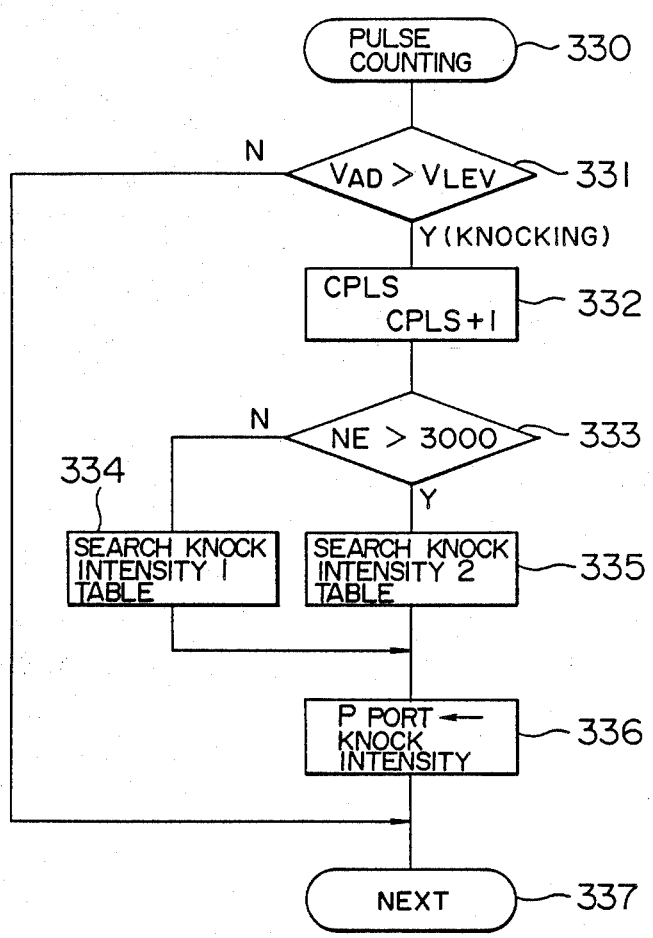

Referring now to FIG. 7, there is illustrated an intensity discriminating flow chart.

The A-D converted value $V_{AD}$ whose pulses have been counted (step 330) is compared (step 331) with the previously determined cylinder knock discrimination level $V_{LEV}$ (step 215-2 in FIG. 4) so that if the A-D converted value is lower than the cylinder knock discrimination level $V_{LEV}$, a transfer is made to the next operation step 337. If the A-D converted value is greater than the cylinder knock discrimination level $V_{LEV}$, that is, when the occurrence of knocking is determined, one is added to the count of a knock pulse counter (step 332) and the intensity corresponding to the number of the pulses is determined from two or more knock intensity tables in accordance with the engine speed (steps 333, 334, 335).

It is to be noted that the knock intensity tables classify the knock intensities in accordance with the corresponding ranges of knock pulse numbers into four intensity levels of "non-knocking", "light knock", "medium knock" and "heavy knock", for example, and the ranges of the knock pulse numbers or the threshold values for the classification are different between a low speed range (Ne<3000) and a high speed range (Ne≧3000), thereby correcting variations of the absolute numbers of knock pulses in the knock discrimination intervals throughout the range of low to high speeds.

The knock intensity determined is read (step 336) and a transfer is made to the next operation step 337.

The preferred embodiment of the invention has been described and now the grounds for its advantages over the prior art and the effects proved by experiments will now be described.

In FIG. 8, the broken line (a) shows the result obtained by measuring the relation between the maximum value $V_{PEAK}$ and average value $V_{MEAN}$ of the peak value $V_{AD}$ of a knock sensor signal in a given interval by varying the amplification factor of an amplifier before an A-D converter. The fact that the experimental result (a) is not passing through the origin denotes that there is no proportional relation between $V_{MEAN}$ and $V_{PEAK}$. The reason is that it is impossible to obtain the true value of $V_{MEAN}$ due to an A-D conversion error, computing error or the like. Therefore, even if the discrimination level is generated as $V_{LEV}=K\times V_{MEAN}$, any variation of the knock sensor output varies the required K-value. However, to obtain the true value of $V_{MEAN}$ requires the addition of a highly efficient A-D converter as well as a ROM and RAM for performing accurate computational operations, and this increases the cost. Thus, in accordance with the invention, noting the fact that any error of $V_{MEAN}$ is dependent on the performance of the A-D converter and the computational capacity, such error is preliminarily investigated and the error is corrected when generating a discrimination level. The resulting error-corrected value ($V_{MEAN}+V_{MOS}$) becomes proportional to the value of $V_{PEAK}$ as shown by the solid line (b) in FIG. 8. Thus, in accordance with this embodiment of the invention, it is possible to greatly reduce variation of the required K-value due to the variation of a knock sensor output.

The effects of the embodiment of this invention will now be described by means of the experimental result shown in FIG. 9. Figure a shows the result obtained by measuring the adaptation constant (K-value) for controlling the knocking at a trace knock and the value of $V_{PEAK}$ by varying the amplification factor for the knock sensor output. In the Figure, the dot-and-dash line (a) shows the result when $V_{LEV}=K\times V_{MEAN}$, the solid line (b) the result when $V_{LEV}=K\times(V_{MEAN}+V_{MOS})$ and the broken line (c) the result when $V_{LEV}=K\times V_{MEAN}+O_S$. With the characteristics (a) and (c), respectively, the K-value differs considerable between the cases when $V_{PEAK}=10$ and when $V_{PEAK}=40$, and this means that a variation of the knock sensor output causes the controlled knock condition to vary considerably for the same K-value. On the contrary, with the characteristic (b) of the embodiment of the invention, the K-value practically remains unchanged with variation of the knock sensor output, and therefore the controlled knock condition always becomes the trace knock. In this way, the embodiment of this invention ensures a knock control which is not subject to the effect of variations in the knock sensor output.

Further, while in the above-described embodiment the amplifiers 30 and 40 have different amplification factors so as to vary the knock sensor output, the knock sensor output is varied even by the variations in output characteristic among the different knock sensors, aging of the knock sensor, etc., and therefore the present invention is effectively applicable to systems other than systems having amplification factor changeover means as in the present embodiment.

We claim:

1. A knock control apparatus for an internal combustion engine comprising:
   a knock sensor for detecting the occurrence of knocking in an engine;
   average value generating means for determining an average value of an output signal of said knock sensor;
   average value correcting means for adding a predetermined correction quantity to said average value determined by said average value generating means;
   knock discrimination level generating means for increasing said corrected average value determined by said average value correcting means by K times by a K-value to generate a knock discrimination level;

knock discrimination means for comparing the knock discrimination level generated by said knock discrimination level generating means and an output signal of said knock sensor to determine the presence or absence of knocking; and driver means responsive to a discrimination result of said knock discriminating means to control a knock control factor including at least one of an ignition timing and a supercharge pressure of said engine.

2. An apparatus according to claim 1, wherein said K-value is varied in accordance with at least one operating condition of said engine.

3. An apparatus according to claim 2, wherein said correction quantity is set to a small value near to a resolution of said average value.

4. An apparatus according to claim 3, wherein said correction quantity is a value preliminarily determined to correct a computing error.

5. A knock control apparatus for an internal combustion engine comprising:

a knock sensor for detecting the occurrence of knocking in an engine;

average value generating means for digitally determining an average value of an output signal of said knock sensor;

correction quantity setting means having a predetermined correction quantity to correct a computing error;

knock discrimination level generating means for increasing both the average value determined by said average value generating means and said correction quantity by K times by a K-value varying in accordance with at least one operating condition of said engine to generate a knock discrimination level;

knock discrimination means for comparing the knock discrimination level generated by said knock discrimination level generating means and an output signal of said knock sensor to determine the presence or absence of knocking; and driver means responsive to a discrimination result of said knock discriminating means to control a knock control factor including at least one of an ignition timing and a supercharge pressure of said engine.

6. An apparatus according to claim 5, wherein said operating condition for varying said K-value is an engine speed.

7. An apparatus according to claim 5, wherein said correction quantity is set to a small value near to a resolution of said average value.

8. A knock control method for an internal combustion engine, comprising the steps of:

detecting occurrence of knocking in an engine;

digitally computing an average value of a knock detecting output signal;

producing a knock discrimination level by increasing both the average value determined and a predetermined correction quantity to correct a computing error by K times by a K-value varying with a change in operating condition of said engine;

determining presence or absence of knocking by comparing the knock discrimination level and a current knock detecting output signal; and controlling a knock control factor including at least one of an ignition timing and a supercharge pressure of said engine in response to the result of the determination.

9. A method according to claim 8, comprising the further steps of changing amplification degree to amplify and A-D convert the knock detecting output signal and changing numbers of digits representing the computed average value and the knock in response to the magnitude of the knock discrimination level.

10. A method according to claim 8, comprising the further steps of (1) periodically A-D converting the knock detecting output signal in a given interval and adapting the converted signal $V_{ADi}$ according to the following equation, $$V_{MADi} = V_{MADi-1} + \frac{V_{ADi} - V_{MADi-1}}{A}$$

where $V_{MADi-1}$ represents an adapted signal value up to the preceding event, $V_{MADi}$ a current adapted value and A a given constant; (2) computing the average value $V_{MEAN}$ according to the following equation, $$V_{MEAN} = V_{MEANi-1} + \frac{V_{MAD} - V_{MEANi-1}}{B}$$

where $V_{MAD}$ represents of a resultant value of the adaptation, $V_{MEANi-1}$ a mean value up to the preceding event and B a given constant; and (3) producing the knock discrimination level $V_{LEV}$ according to the following equation, $$V_{LEV} = K(V_{MEAN} + V_{MOS})$$

where $V_{MOS}$ represents the predetermined correction quantity.

11. A method according to claim 8, comprising the further step of A-D converting each one cycle sine-wave of the knock detecting signal with a given delay time after detecting a rise portion of the signal above a given threshold level.

12. A method according to claim 8, comprising the further steps of A-D converting the knock detecting output signal, comparing the converted signal with the knock discrimination level, detecting the frequency of the converted signal when the converted signal exceeds the discrimination level, and detecting a knock intensity with the detected frequency by referring to frequency-intensity tables predetermined according to ranges of engine speed.

* * * * *